US006986596B2

(12) United States Patent
Evans

(10) Patent No.: US 6,986,596 B2
(45) Date of Patent: Jan. 17, 2006

(54) EXTERIOR REARVIEW MIRROR ASSEMBLY

(75) Inventor: Peter A. Evans, Commerce Township, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 172 days.

(21) Appl. No.: 10/653,530

(22) Filed: Sep. 2, 2003

(65) Prior Publication Data

US 2005/0047160 A1 Mar. 3, 2005

(51) Int. Cl.
*B60R 1/12* (2006.01)
*B60Q 1/34* (2006.01)
(52) U.S. Cl. ............... 362/494; 362/140; 362/540; 362/544; 359/850
(58) Field of Classification Search ........ 359/548–550, 359/842, 850; 362/135–144, 331, 494, 540, 362/544

See application file for complete search history.

(56) References Cited

U.S. PATENT DOCUMENTS

| 4,583,155 | A | * | 4/1986 | Hart ........................... 362/494 |
| 4,863,254 | A | * | 9/1989 | Dyer ........................... 359/850 |
| 5,361,190 | A | * | 11/1994 | Roberts et al. ............. 362/135 |
| 5,863,116 | A | | 1/1999 | Pastrick et al. ............. 362/494 |
| 6,086,229 | A | | 7/2000 | Pastrick ...................... 362/494 |
| 6,250,783 | B1 | | 6/2001 | Stidham et al. ............. 362/494 |
| 6,511,189 | B1 | * | 1/2003 | Henion et al. .............. 359/850 |
| 6,536,908 | B2 | * | 3/2003 | Shuen ........................ 359/850 |

* cited by examiner

*Primary Examiner*—Alan Cariaso
(74) *Attorney, Agent, or Firm*—Tarolli, Sundheim, Covell & Tummino L.L.P.

(57) ABSTRACT

An exterior rearview mirror assembly (10, 110) for a vehicle includes a housing (14, 114) connectable to a vehicle (12). A mirror (18) is disposed in an opening (16) in the housing (14, 114). A member (70, 170) connected to the housing (14, 114) has a reflective portion (78, 178) for reflecting light from another vehicle. The member (70, 170) also has a turn signal lens (88, 188) through which a turn signal light (36, 136) shines. A second lens (46) may direct light from the turn signal light (36) to the turn signal lens (88).

14 Claims, 3 Drawing Sheets

EXTERIOR REARVIEW MIRROR ASSEMBLY

FIELD OF THE INVENTION

The present invention relates to an exterior rearview mirror assembly, and more specifically, to a rearview mirror assembly having a reflective portion for reflecting light from another vehicle and a turn signal lens through which a turn signal light shines.

BACKGROUND OF THE INVENTION

A known exterior rearview mirror assembly for a vehicle includes a housing connectable to the vehicle. A mirror is disposed in an opening in the housing. The exterior rearview mirror assembly includes a turn signal lens through which an actuatable turn signal light shines. A security light or puddle lamp mounted on the exterior rearview mirror assembly directs light downwardly and rearwardly from the mirror assembly toward the ground near the vehicle door and/or the vehicle door.

SUMMARY OF THE INVENTION

The present invention relates to an exterior rearview mirror assembly for a vehicle including a housing connectable to the vehicle. A mirror is disposed in an opening in the housing. A member connected to the housing has a reflective portion for reflecting light from another vehicle. The member connected to the housing also has a turn signal lens through which a turn signal light shines. A second lens may direct light from the turn signal light to the turn signal lens.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE INVENTION

Figure 1:
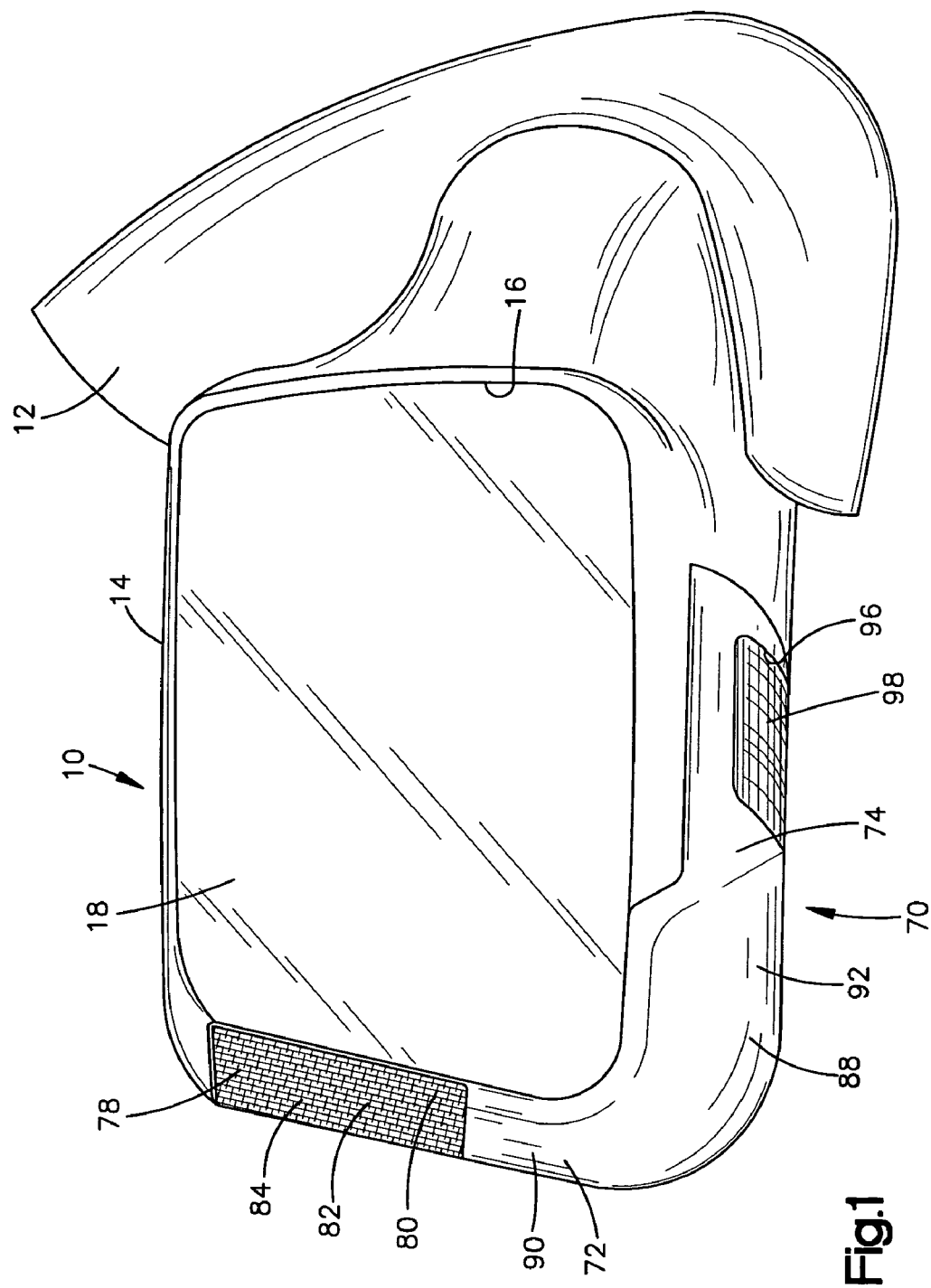
FIG. 1 is a schematic perspective view of an exterior rearview mirror assembly for a vehicle.
Figure 2:
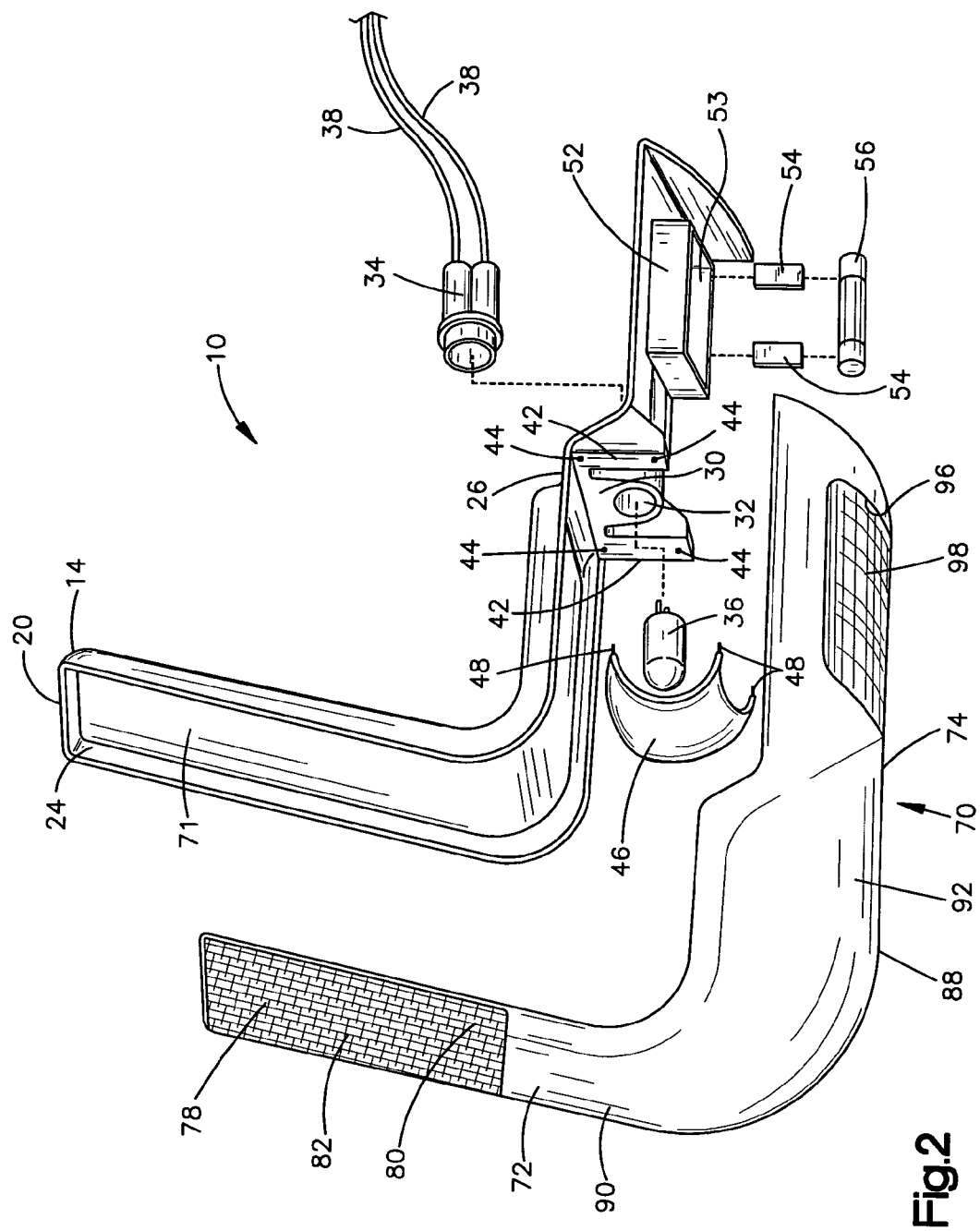
FIG. 2 is an exploded view of a portion of the exterior rearview mirror assembly of FIG. 1.

An exterior rearview mirror assembly 10 is illustrated in FIGS. 1 and 2. The rearview mirror assembly 10 (FIG. 1) is installed on a driver's side of a vehicle 12. Although only one rearview mirror assembly 10 is shown, it is understood that a second rearview mirror assembly similar to the rearview mirror assembly 10 is connected to a passenger side of the vehicle 12. The mirror assembly 10 may be of a typical breakaway design. The mirror assembly 10 includes a housing 14 connected to the vehicle 12. The housing 14 may be of any desired shape and includes an opening 16. A mirror 18 is disposed within the opening 16. The mirror 18 is supported within the opening 16 of the housing 14 in a known manner.

The housing 14 includes a mounting portion 20 (FIG. 2) located on an exterior surface of the housing. The mounting portion 20 of the housing 14 includes a vertically extending portion 24 and a horizontally extending portion 26. The vertical portion 24 extends generally perpendicular to the horizontal portion 26. The horizontal portion 26 includes a downwardly (as viewed in FIG. 2) extending wall 30 with an opening 32. A socket 34 extends into the opening 32 and receives a turn signal light 36. Electrical wires 38 extend from the socket 34 and connect the socket to a turn signal actuator (not shown).

A pair of mounting members 42 extend downwardly from the horizontal portion 26 of the housing 14. The mounting members 42 extend on opposite sides of the opening 32. Each of the mounting members 42 includes a pair of openings 44 for mounting a lens 46 to the housing 14. The lens 46 includes pegs 48 that extend into the openings 44 in the mounting members 42 so that the turn signal light 36 shines through the lens 46. It is contemplated that the lens 46 could be a frenel lens.

The horizontal portion 26 of the housing 14 includes a rectangular puddle lamp or security light mounting portion 52 defining a rectangular recess 53. A pair of contacts 54 mount a puddle lamp or security light 56 in the recess 53. The puddle lamp or security light 56 illuminates the ground adjacent the vehicle door and/or a portion of the vehicle door in a known manner.

An L-shaped member 70 (FIGS. 1 and 2) is connected to the housing 14 to cover the puddle lamp or security light 56 and the lens 46. The member 70 extends into a recess 71 in the mounting portion 20 and is connected to the mounting portion of the housing 14 in any suitable manner, such as with an adhesive or a snap fit. The member 70 includes a vertical portion 72 connected with the vertical portion 24 of the housing 14. The member 70 includes a horizontal portion 74 extending generally perpendicular to the vertical portion 72 and connected to the horizontal portion 26 of the housing 14.

The vertical portion 72 of the member 70 includes a reflective portion 78 at an upper end (as viewed in FIGS. 1 and 2) for reflecting light from another vehicle. The reflective portion 78 includes a rear portion 80 facing in a rearward direction of the vehicle to reflect light from another vehicle to the rear. The reflective portion 78 also includes a side portion 82 facing in a lateral direction of the vehicle to reflect light from another vehicle to the side. The reflective portion 78 also includes a front portion (not shown) facing in a forward direction of the vehicle to reflect light from another vehicle to the front.

The member 70 includes a translucent turn signal lens 88 formed as one-piece with the reflective portion 78. The light emitted by the turn signal light 36 shines through the turn signal lens 88 upon actuation of the turn signal. The turn signal lens 88 includes a vertical portion 90 extending downward from the reflective portion 78. A horizontal portion 92 of the turn signal lens 88 extends generally perpendicular to the vertical portion 90. Upon actuation of the turn signal, the lens 46 directs light emitted by the turn signal light 36 toward the turn signal lens 88 of the member 70. The lens 46 causes the entire turn signal lens 88 to illuminate in a uniform manner.

The member 70 includes an opening 96 in the horizontal portion 74. The puddle lamp or security light 56 shines through the opening 96 to illuminate the ground adjacent the vehicle door and/or a portion of the vehicle door. A puddle lamp or security light lens 98 is mounted in the opening 96 in the member 70. The puddle lamp or security light 56 shines through the lens 98. It is contemplated that the lens 98 may be formed as one-piece with the member 70.

Although the mirror assembly 10 is shown with the reflective portion 78, the turn signal light 36, and the puddle lamp or security light 56, it is contemplated that the mirror assembly could have only the reflective portion or the turn signal light. It is also contemplated that the mirror assembly 10 may only include the reflective portion 78 with the turn signal light 36 or the puddle lamp 56. Furthermore, it is contemplated that the mirror assembly 10 may include only the turn signal light 36 and the puddle lamp 56.

Figure 3:
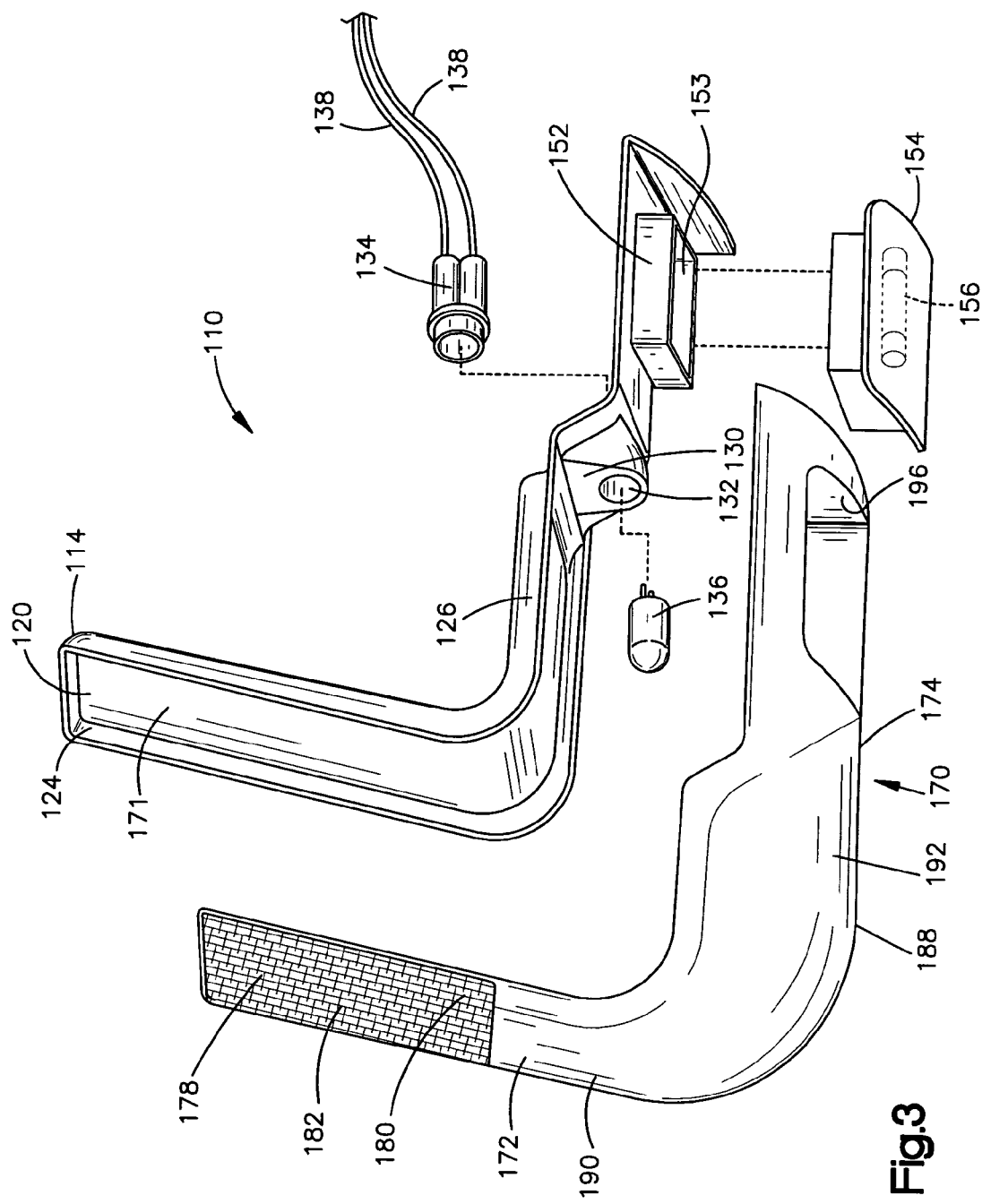
FIG. 3 is an exploded view of another embodiment of an exterior rearview mirror assembly.

Another embodiment of an exterior rearview mirror assembly 110 is illustrated in FIG. 3. The embodiment illustrated in FIG. 3 is substantially similar to the embodiment illustrated in FIGS. 1–2. Accordingly, the embodiment illustrated in FIG. 3 will not be described in detail.

The rearview mirror assembly 110 is installed on a driver's side of a vehicle. It is understood that a second rearview mirror assembly similar to the rearview mirror assembly 110 is connected to a passenger side of the vehicle. The rearview mirror assembly 110 may be of the typical breakaway design. The mirror assembly 110 includes a housing 114 connected to the vehicle. The housing 114 may be of any desired shape and include an opening. A mirror is supported within the opening of the housing 114 in a known manner.

The housing 114 includes a mounting portion 120 located on an exterior surface of the housing. The mounting portion 120 includes a vertically extending portion 124 and a horizontally extending portion 126. The vertical portion 124 extends generally perpendicular to the horizontal portion 126. The horizontal portion 126 includes a downwardly (as viewed in FIG. 3) extending wall 130 with an opening 132. A socket 134 extends into the opening 132 and receives a turn signal light 136. Electrical wires 138 extend from the socket 134 and connect the socket to a turn signal actuator (not shown).

The horizontal portion 126 of the housing 114 includes a rectangular puddle lamp or security light mounting portion 152 defining a rectangular recess 153. A puddle lamp or security light assembly 154 is mounted in the recess 153 in a known manner. The puddle lamp or security light assembly 154 includes a puddle lamp or security light 156 that illuminates the ground adjacent to the vehicle door and/or a portion of the vehicle door.

An L-shaped member 170 is connected to the housing 114 to cover the turn signal light 136. The member 170 extends into a recess 171 in the mounting portion 120 and is connected to the mounting portion of the housing 114 in any suitable manner, such as with an adhesive or a snap fit. The member 170 includes a vertical portion 172 connected with the vertical portion 124 of the housing 114. The member 170 includes a horizontal portion 174 extending generally perpendicular to the vertical portion 172 and connected to the horizontal portion 126 of the housing 114.

The vertical portion 172 of the member 170 includes a reflective portion 178 at an upper end (as viewed in FIG. 3) for reflecting light from another vehicle. The reflective portion 178 includes a rear portion 180 facing in an rearward direction of the vehicle to reflect light from another vehicle to the rear. The reflective portion 178 also includes a side portion 182 facing in a lateral direction of the vehicle to reflect light from another vehicle to the side. The reflective portion 178 also includes a front portion (not shown) facing in a forward direction of the vehicle to reflect light from another vehicle to the front.

The member 170 includes a translucent turn signal lens 188 formed as one-piece with the reflective portion 178. The light emitted by the turn signal light 136 shines through the turn signal lens 188 upon actuation of the turn signal. The turn signal lens 188 includes a vertical portion 190 extending downward from the reflective portion 178. A horizontal portion 192 of the turn signal lens 188 extends generally perpendicular to the vertical portion 190. Upon actuation of the turn signal, the turn signal light 136 illuminates the turn signal lens 188.

The member 170 includes an opening 196 in the horizontal portion 174. The puddle lamp or security light 156 shines through the opening 196 to illuminate the ground adjacent the vehicle door and/or a portion of the vehicle door. The puddle lamp or security light assembly 154 is inserted into the opening 196 in the member 170 and into the recess 153 in the housing 114.

Although the mirror assembly 110 is shown with a reflective portion 178, a turn signal light 136, and a puddle lamp or security light 156, it is contemplated that the mirror assembly may only have the reflective portion. It is also contemplated that the mirror assembly may only include the reflective portion 178 with the turn signal light 136 or the puddle lamp 156.

From the above description of the invention, those skilled in the art will perceive improvements, changes and modifications. Such improvements, changes and modifications within the skill of the art are intended to be covered by the appended claims.

What is claimed is:

1. An exterior rearview mirror assembly for a vehicle comprising:
   a housing connectable to the vehicle, said housing having an opening;
   a mirror disposed in said opening;
   a member connected to said housing, said member having a reflective portion for reflecting light from another vehicle, said member being L-shaped, said member having a vertical portion for connecting to a vertical portion of said housing and a horizontal portion extending from said vertical portion for connecting to a horizontal portion of said housing, said reflective portion being located on said vertical portion of said member, said member including a turn signal lens through which a turn signal light shines, said turn signal lens being located on said horizontal portion of said member.

2. An exterior rearview mirror assembly as set forth in claim 1 wherein said reflective portion includes a rear portion facing in a rearward direction of the vehicle.

3. An exterior rearview mirror assembly as set forth in claim 1 wherein said reflective portion has a front portion facing in a forward direction of the vehicle.

4. An exterior rearview mirror assembly as set forth in claim 1 wherein said reflective portion has a side portion facing in a lateral direction of the vehicle.

5. An exterior rearview mirror assembly as set forth in claim 4 wherein said reflective portion has a front portion facing in a forward direction of the vehicle.

6. An exterior rearview mirror assembly as set forth in claim 4 wherein said reflective portion has a rear portion facing in a rearward direction of the vehicle.

7. An exterior rearview mirror assembly as set forth in claim 6 wherein said reflective portion has a front portion facing in a forward direction of the vehicle.

8. An exterior rearview mirror assembly as set forth in claim 1 wherein said reflective portion and said turn signal lens are formed as one-piece.

9. An exterior rearview mirror assembly as set forth in claim 1 further including a second lens directing light from said turn signal light to said turn signal lens.

10. An exterior rearview mirror assembly as set forth in claim 9 wherein said second lens is a frenel lens.

11. An exterior rearview mirror assembly as set forth in claim 1 wherein said member includes an opening through which a lamp shines.

12. An exterior rearview mirror assembly for a vehicle comprising:

a housing connectable to the vehicle, said housing having an opening;

a mirror disposed in said opening;

a member connected to said housing having a turn signal lens through which a turn signal light shines; and a second lens directing light from the turn signal light to said turn signal lens;

said member including a reflective portion for reflecting light from another vehicle, said reflective portion including a rear portion facing in a rearward direction of the vehicle, a front portion facing in a forward direction of the vehicle, and a side portion facing in a lateral direction of the vehicle;

said reflective portion and said turn signal lens being formed as one-piece;

said member being L-shaped, said member having a vertical portion for connecting to a vertical portion of said housing and a horizontal portion extending from said vertical portion for connecting to a horizontal portion of said housing, said turn signal lens being located on said horizontal portion of said member and said reflective portion being located on said vertical portion of said member.

13. An exterior rearview mirror assembly as set forth in claim 12 wherein said second lens is a frenel lens.

14. An exterior rearview mirror assembly as set forth in claim 12 wherein said member includes an opening through which a lamp shines.

* * * * *